Patented Apr. 28, 1942

2,280,815

UNITED STATES PATENT OFFICE 2,280,815

METHOD OF OBTAINING STEROLS

Erhard Fernholz, Princeton, N. J., assignor to E. R. Squibb & Sons, New York, N. Y., a corporation of New York No Drawing. Application March 20, 1940, Serial No. 325,009

8 Claims. (Cl. 260—397.2)

This invention relates to obtaining sterols, especially phytosterols.

The prior methods of obtaining sterols have been unsatisfactory because of their inefficiency and high cost. Thus, the method of obtaining sterols from sterol-containing oil by saponifying the oil and extracting the sterols from the soap solution with an organic solvent for sterols, may do for laboratory, but not for large-scale operations, because of the small proportion of sterols in the oil and the consequent inefficiency of the extraction. Another prior method is based on concentration of the sterol content of the oil by distillation, the sterols—having a lower boiling-point than the oil—accumulating in the first fractions of the distillate; thus, a sterol-containing oil is steam-distilled under reduced pressure at about 200° C., and the sterols are recovered from the distillate by saponification and extraction with an organic solvent. In another method, the distillation of the sterol-containing oil is effected under a high vacuum (and correspondingly low temperature) to minimize thermal decomposition of the sterols. Such distillation methods, however, are necessarily expensive and therefore practical only for the recovery of especially valuable products such as vitamins A and D.

It is the object of this invention to provide a simple and efficient method of obtaining sterols, especially phytosterols.

It has been found that the fatty acids derived from sterol-containing oils boil at a considerably lower temperature than the sterols, and hence the separation of such acids may be readily effected by distillation. Accordingly, in the practice of this invention, sterols are obtained from the fatty acids, preferably the soapstock fatty acids, derived from sterol-containing oils. By "soapstock" is meant, of course, the by-product soap obtained in the refining of oils by neutralizing the free fatty acids. The use of soapstock as the source material for obtaining sterols is particularly advantageous, since the concentration of sterols in the soapstock is many times that in the unrefined oil, and the scale of the operations required for obtaining the sterols is accordingly much reduced.

The method of this invention essentially comprises hydrolyzing a sterol-containing oil, preferably a soapstock derived from a sterol-containing oil, distilling off the fatty acids, and recovering the sterols from the residue. This recovery is advantageously effected by treating the residue with an excess of alcoholic alkali, diluting with water, extracting the sterols with an organic solvent therefor (e. g., ether, benzene, or chloroform), and purifying the sterols by recrystallization.

The soapstock source material may be a commercial by-product of the refining of a sterol-containing oil, or one specially prepared for the purpose of obtaining sterols; and it may be derived from any phytosterol-containing vegetable oil, e. g., soya-bean oil, coconut oil, rapeseed oil, cottonseed oil, or peanut oil; or from any cholesterol-containing animal oil, e. g., fish oils.

The following example is illustrative of the invention: A crude stigmasterol-containing oil (e. g., soya-bean oil) is treated with an amount of sodium hydroxide sufficient to neutralize the free fatty acids. The soap precipitate formed (soapstock) carries down some of the phytosterol content of the soya-bean oil, the concentration of phytosterols in the precipitate being about three times that in the crude oil. The soapstock is hydrolyzed with the requisite quantity of sulfuric or hydrochloric acid, the fatty acids obtained are distilled off at a temperature of about 200° C. by means of superheated steam and vacuum, and the pitch residue (containing the phytosterols as fatty acid esters) is recovered.

150 lbs. of the pitch is refluxed with a solution of 38 lbs. KOH in 25 gallons of methanol for one hour, and the mixture is diluted with water and extracted with four 25-gallon portions of ether. The ether extracts are washed with water and distilled. On recrystallization of the residue from 90% isopropyl alcohol, a mixture of phytosterols (30 lb.) is obtained in substantially pure form. Stigmasterol may be isolated from the mixture by acetylation and bromination, as described by Windaus, Ber. Chem. Ges. 39, 4378 (1906).

The invention may be variously otherwise embodied within the scope of the appended claims.

I claim:

1. The method of obtaining a sterol from a sterol-containing oil which comprises deriving a sterol-fatty-acid mixture from the oil, distilling off the fatty acids, and recovering the sterol from the residue.

2. The method of obtaining a sterol which comprises hydrolyzing a soapstock derived from a sterol-containing oil, distilling off the fatty acids, and recovering the sterol from the residue.

3. The method of obtaining a sterol from a sterol-containing oil which comprises neutralizing the free fatty acids in the oil, hydrolyzing the precipitated soap, distilling off the fatty acids, and recovering the sterol from the residue.

4. The method of obtaining a phytosterol which comprises hydrolyzing a soapstock derived from a phytosterol-containing oil, distilling off the fatty acids, and recovering the phytosterol from the residue.

5. The method of obtaining stigmasterol which comprises hydrolyzing a soapstock derived from a stigmasterol-containing oil, distilling off the fatty acids, and recovering the stigmasterol from the residue.

6. The method of obtaining a sterol which comprises hydrolyzing a soapstock derived from a sterol-containing oil, distilling off the fatty acids at a temperature of about 200° C. with steam under vacuum, and recovering the sterol from the residue.

7. The method of obtaining a sterol which comprises hydrolyzing a soapstock derived from a sterol-containing oil, distilling off the fatty acids, treating the residue with an excess of alcoholic alkali, diluting with water, and extracting the solution with an organic solvent for the sterol.

8. The method of obtaining stigmasterol from a stigmasterol-containing oil which comprises neutralizing the free fatty acids in the oil, hydrolyzing the precipitated soap, distilling off the fatty acids, and recovering stigmasterol from the residue.

ERHARD FERNHOLZ.